US008885236B2

(12) United States Patent
Woolfe

(10) Patent No.: US 8,885,236 B2
(45) Date of Patent: Nov. 11, 2014

(54) NATURAL LANGUAGE COLOR COMMUNICATION AND SYSTEM INTERFACE

(76) Inventor: Geoffrey J. Woolfe, Canandaigua, NY (US)

(*) Notice: Subject to any disclaimer, the term of this patent is extended or adjusted under 35 U.S.C. 154(b) by 1788 days.

(21) Appl. No.: 11/479,484

(22) Filed: Jun. 30, 2006

(65) Prior Publication Data

US 2008/0007749 A1    Jan. 10, 2008

(51) Int. Cl.
  *G06F 15/00*   (2006.01)
  *G06F 17/30*   (2006.01)
  *H04N 1/60*    (2006.01)

(52) U.S. Cl.
  CPC ............ *G06F 17/3025* (2013.01); *H04N 1/60* (2013.01)
  USPC ............ 358/518; 358/1.9; 382/162; 382/167

(58) Field of Classification Search
  USPC ................................ 358/1.9, 518
  See application file for complete search history.

(56) References Cited

U.S. PATENT DOCUMENTS

| 5,611,030 | A | 3/1997 | Stokes |
| 7,031,920 | B2 | 4/2006 | Dowling et al. |
| 7,043,474 | B2 | 5/2006 | Mojsilovic et al. |
| 7,430,063 | B2 * | 9/2008 | Aschenbrenner et al. ..... 358/1.9 |
| 7,525,684 | B2 * | 4/2009 | Majewicz ...................... 358/1.9 |
| 2005/0195453 | A1 * | 9/2005 | Asano ........................... 358/523 |
| 2006/0025987 | A1 * | 2/2006 | Baisley et al. .................... 704/4 |
| 2006/0087517 | A1 | 4/2006 | Mojsilovic |
| 2007/0091106 | A1 | 4/2007 | Moroney |
| 2007/0100786 | A1 | 5/2007 | Moroney |
| 2007/0116353 | A1 | 5/2007 | Moroney |

FOREIGN PATENT DOCUMENTS

JP        11 194866 A    7/1999

OTHER PUBLICATIONS

Spatial Data and the Voronoi Tessellation, by Hrvoje Lukatela and John Russell, Dec. 1992 Dr. Dobb's Journal), pp. 1-10.
Disclosed Anonymously: "Method to translate color requirements from a natural language-like representation into standard color references", Research Discloure, Mason Publications, Hampshire, GB, vol. 503, No. 65, Mar. 1, 2006, XP007136036 ISSN: 0374-4353.
European Patent Office, European Search Report for EP 07110925.0, 2 pages.

* cited by examiner

*Primary Examiner* — Qian Yang

(57) ABSTRACT

A natural language color control system. The system includes a dictionary of ordinary language color terms, a working color space, wherein every portion of the working color space is mapped to at least one term in the color term dictionary, and an ordinary language command lexicon and syntax for use with the ordinary language color terms that correspond to transformations in the working color space. The dictionary of color terms may be created or chosen from pre-existing dictionaries. This system could be used to adjust colors in images as well as the meaning of verbally-defined color terms such as for searching a database.

9 Claims, 5 Drawing Sheets

NATURAL LANGUAGE COLOR COMMUNICATION AND SYSTEM INTERFACE

The embodiments disclosed herein relate to a color control system, and more specifically, a user-friendly color control system for imaging novices.

There are many ways to specify color and color difference. Color imaging scientists and engineers use precise, numeric color specifications based on standardized color spaces and color encodings. Such color specifications are often based on the color matching behavior of a standard human observer. Color matching behavior has been embodied in the CIEXYZ system of colorimetry, for example. Other related systems based on the color matching behavior of a standard human observer include the widely used CIELab or the less common CIELuv system. These color specifications are commonly called device-independent color encodings. Color imaging scientists and engineers also use device-dependent color specifications in which colors can be precisely specified in terms of the color characteristics of a particular device. These color characteristics include the white point and color primaries (or colorants) of the device. Colors are also specified using color order systems such as the Munsell Book of Color, the Swedish Natural Color System, or the Pantone Color Formula Guide. These systems of color specifications are also precise, but are more commonly used by professionals in the color graphics and design industries rather than color imaging.

Another ubiquitous form of specifying color is to use color names in natural language. Although natural language is a far less precise method of color specification than those discussed above, it is nonetheless the most widely used and best understood method of color specification used by consumers of color. This method of color specification uses common color names, such as red, green, blue, etc. It also uses combinations of common color names to refine the specification. Examples of such combinations include reddish-brown, greenish-blue, yellowish-green etc. In addition, natural language provides many modifying adjectives to provide further subtle discrimination in color specification. Examples of such modifying adjectives include light, dark, bright, saturated, vivid, muddy, moderate, dull, pale, washed-out etc.

Natural color languages use other words and phrases for specifying colors and color differences, which may not be as precisely defined as other color specification methods. Examples of these words and phrases include "slightly less yellow", "much darker", "more saturated", "greener", "significantly punchier", and "a smidge lighter". Now, while these expressions are certainly imprecise, many people commonly use them to describe how they would like their printed material to be changed to meet their requirements. However, color management systems that allow a user to modify an input color or set of input colors generally do not use natural language inputs and require the user to develop an understanding of the behavior of the various controls provided in the user interface of such systems. Such systems are therefore difficult to use for many people.

Color management systems allow users to control or adjust color in image or document processing applications where images are modified to increase their pleasantness or to meet the preferences of a user. For example, a user may want to adjust the background color of a picture, or the flesh tones in a digital image prior to printing. Device controls also use color control systems to modify the color reproduction characteristics of a device. Generally, color printing and image processing applications include a user interface that allows the user to communicate color requirements or instructions. However, virtually all color image processing and device control applications have been developed by color imaging scientists and engineers, using quantitative, numerical systems of color specification rather than language-based color specification.

General, non-specialist consumers of image processing and device control applications often have difficulty navigating the user interface of such applications. Many consumers/users, who have little or no understanding of color encodings, describe color using natural language phrases. The scientists and engineers that develop these applications describe color using highly precise color encodings. Most image processing applications, device control interfaces, color pickers etc allow users to specify color and color change only in terms of a numerical, quantitative color space. The control tools are often in the form of sliders or dialog boxes or graphically displayed functions (e.g., curves in Photoshop) that a user can manipulate. These control tools can be difficult to use even for seasoned professionals and it can take many adjustments to achieve an intended modification. In the case of color-naïve users, the situation is extremely difficult and often leads to frustration and disappointment. Most users are not trained in the numerical, quantitative color spaces, such as RGB, CIELab, or HSV used in most applications. Therefore, most consumers of color images and documents cannot successfully adjust the colors in these images or documents. It then becomes the job of the graphics professional or printer to translate the spoken or written color requirements of the general public into numerical settings in image editing or device control applications. Many color professionals require extensive training and experience in order to successfully and efficiently manipulate controls in such interfaces to achieve an aesthetic effect that can be stated simply and concisely in verbal terms. It would be desirable to provide a natural language interface for color adjustment and image processing applications to address this color communication gap.

A natural language interface would be a significant advantage to most users of image processing applications and users of color imaging devices. Implementing a natural color interface in such applications would significantly bridge the communication gap that exists between consumers of color management products and color professionals. The natural language method of color specification although lacking the precision of color encodings or color order systems, is still capable of specifying a wide range of colors with reasonable precision. Furthermore, since both color professionals and consumers of color use understand the natural language of color, it is a natural choice as a simple-to-use method of color communication or a color user-interface for technical applications such as image/document creation and editing programs and color device control software. While, verbal description of color and color difference is less precise than the numerical specification of color spaces, one can nonetheless argue that a less precise, but better understood communication system is still preferable to a highly precise but unintelligible interface.

Developing a mapping between natural language color specifications and the precise numerical color encodings used in color image processing and device control applications is not a simple problem. A number of issues complicate this problem. First, there is no uniquely defined natural color language. The words and grammar used to describe color can vary based on culture, geographical location, professional affiliation, and individual preference. Second, the boundaries between named colors are not precisely defined—indeed, they are somewhat fuzzy and can vary, to some extent, between individuals. Third, the lower level of precision afforded by a natural language interface may be perfectly adequate in some applications but be unsuitable for others.

The color communication and system interface as described in embodiments herein may help bridge the communication gap between color-savvy professionals and technicians who develop image processing and device control applications, or perform image editing operations, and the color-naïve consumers of color documents who are trying to specify how they want their images or documents to appear (i.e., their preference). This color communication and system interface may help bridge this gulf between a color-naïve public and color control systems by providing a mapping between the natural language descriptions of color and color difference used by color-naïve consumers to the numerical color space values used in image processing algorithms and device control transforms. Examination of such instructions indicates that there are two types of color specification in each phrase. The first type of color specification indicates the target range of colors that a user wants to adjust. The target range of colors corresponds to a region or subvolume of the entire color space. The second type of color specification indicates the color modification to be implemented. Table 1 illustrates these two types of color specification, using several example color transform instructions.

TABLE 1

| Natural language Color Specification Phrase | Target Color Range | Color Modification to be Implemented |
|---|---|---|
| Make the greens moderately lighter | Green colors | Moderately lighter |
| Make the blues slightly less purple | Blue colors | Slightly less purple |
| Make the red and purple regions much less contrasty | Red and purple colors | Much less contrast |
| Make the yellows but not greenish-yellows a little more orange | the yellows but not greenish-yellows | a little more orange |

What is proposed is a natural language color communication system and interface to color processing applications. It allows users to specify verbally, using natural language terms, regions of color space to which to apply a particular transform. The transform to be applied is also verbally specified using natural language. Examples of verbal color specification and processing transform instructions might include, for example, "make the greens moderately lighter" or "make the blues slightly less purple" or "make the red regions much less contrasty".

Embodiments of the present invention include a natural language color control system. The system includes one or more color term dictionaries of ordinary language color names or descriptions, a working color space, wherein every point in the working color space can be mapped to at least one term in a color term dictionary, and an ordinary language command lexicon and syntax for use with the ordinary language color terms that correspond to transformations in the working color space.

Embodiments of the present invention also include a method for adjusting the color of an image. The method includes generating an electronic image, mapping the image to a working color space, and entering an ordinary language command to adjust the color of at least a portion of the image, the command corresponding to a transformation in the working color space, wherein the color of the image is adjusted in response to the entered command.

Embodiments of the present invention also include a natural language color control method that includes selecting a subject for color adjustment and entering an ordinary language command to adjust a portion of the subject having a particular verbally defined color, the command corresponding to a transformation in the color space. The portion of the subject is adjusted in response to the entered command.

Various exemplary embodiments will be described in detail, with reference to the following figures.

Figure 5:
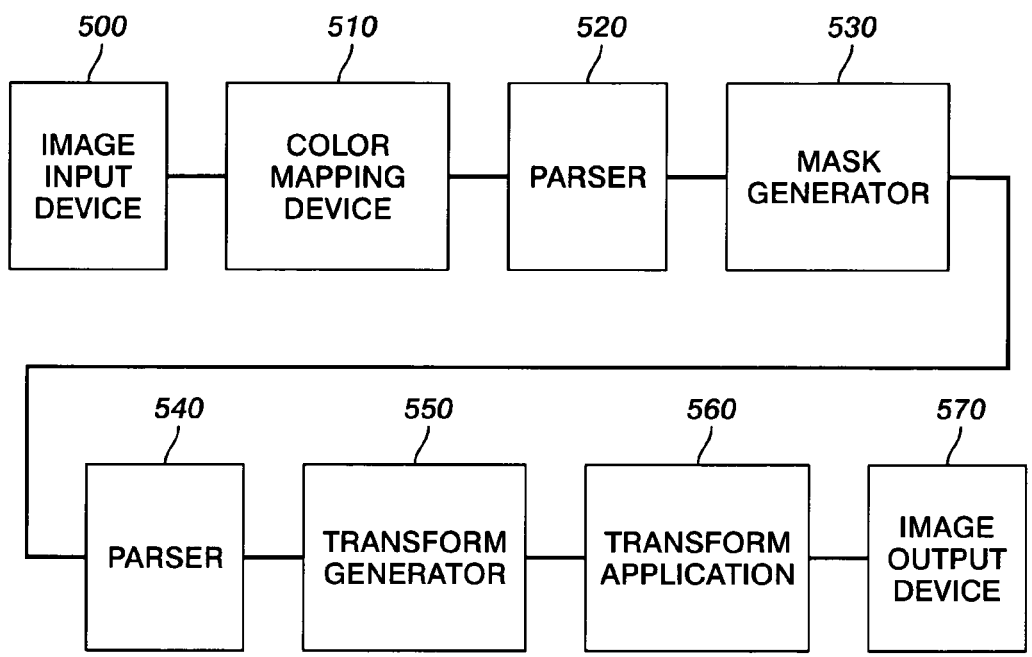

FIG. 5 schematically illustrates an exemplary embodiment of a natural language color modification system.

A printing device as used herein refers to any device that produces visible marks on paper. Printing devices include, for example, copiers, printers, or multi-function devices. Paper as used herein refers to any markable media such as, for example, paper, plastic, and textile materials.

A document as referred to herein includes one or more pages of electronic data that can be printed or viewed on a display screen. A document can include, for example, images and/or text.

The embodiments disclosed herein include a natural language color communication system and interface that helps non-experts to communicate color information, intents, and instructions in a reasonably accurate and unambiguous fashion. One aspect of the systems and methods disclosed herein are mathematical models that map natural language color names and color intents to specific colorimetric or color appearance coordinates. The embodiments of the invention disclosed herein can be used in a range of applications from document creation through proofing and pre-press activities to device control.

In addition to reducing the frustration and disappointment levels of consumers of color management systems, a natural language color interface can reduce the number of iterations required in the proofing cycle or the document editing and approval process. It can also make color tools more accessible to color-naïve consumers.

Image or document processing applications where users may modify images to increase their pleasantness or to meet the preference of the user could use a natural language color management system. Such applications would include one or more transforms that are applied directly to pixels of an image. Another common application for a natural language color management system is in device control. For example, the natural language interface would allow users to modify the color reproduction characteristics of a device by applying a color correction transform to its color management profile. Examples of verbal specifications in such an application might include "increase contrast slightly", "print reds a little more orange and lighter," or "make the light greens moderately more blue".

To create a natural language color control system, one or more dictionaries of ordinary language color terms should be selected or generated. There is no restriction placed on the lexicon of a color name dictionary, other than that it be suitable for the intended user. While the concept of creating a color name dictionary might seem daunting, there have already been a number of successful dictionaries created. Furthermore, there is widespread commonality in the language used to describe color. Indeed, numerous studies have shown that in English and in most European languages there are only 11 basic color names (black, white, red, green, yellow, blue, brown, pink, orange, purple, and gray). Although the boundaries between these fundamental color names are somewhat fuzzy, there is widespread agreement between observers when asked to name color patches. These 11 fundamental color names are also commonly combined into compound names to allow for finer discrimination and precision in color naming. Examples of such combinations include yellowish-green, green-blue, brownish-red, reddish-purple etc. Note that there are also instances where such combinations are replaced by a new, single-word color name. For example, someone might call green-blue—cyan or turquoise, greenish-brown—olive, reddish-orange—ochre, and greenish-yellow—chartreuse. In addition, there are a number of modifiers that are commonly used in conjunction with the fundamental or compound color names. These modifiers include words such as, for example, light, dark, pale, deep, saturated, medium, dull, pastel, and so on. The color names, compound names, and modified names constitute the terms in one or more color dictionaries.

Color name dictionaries are not new. The National Bureau of Standards in collaboration with the Inter-Society Color Council has already created a standardized color name dictionary. This is called the NBS-ISCC Dictionary of Color Names. It consists of 267 colors specifications with associated names. The names consist of modifiers and either fundamental or compound color names. A number of earlier studies have also developed color naming vocabularies.

To be useful, the terms in a color dictionary should correspond to regions of color space such that every region of color space corresponds to a color term. In embodiments, there may be a direct mapping between finite regions (or subvolumes) of the color space and the color terms in the dictionary. Alternatively, the terms could map to prototypical point locations in the color space (e.g., points in the color space may correspond to pure or ideal shades of cyan and magenta, or navy blue and fire engine red.)

If a color name dictionary is provided as a set of color names with associated prototypical locations in a color space then a means to partition the color space into regions assigned to the various names of the color name dictionary is required. A variety of methods may be used to create these regions. The only requirement is that every location in the color space be assigned to at least one region. The regions may be disjoint or overlapping. There is no restriction on the topological genus of a region and a region may consist of multiple, non-connected sub-regions. One example of a means to partition the color space is to compute the Voronoi partition of the set of prototypical locations in the color space. This approach computes a convex Voronoi cell around each prototypical color space location such that all colors inside the cell are closer to the prototypical location than to any other prototypical location.

Other means of assigning regions of color space to the terms in a color dictionary include using a statistical analysis of the results of psychophysical color naming studies. This method would work to directly map color terms with regions of color space or could be used to define the regions around prototypical locations in color space.

The working color space in which the prototypical locations of named colors are defined can, in theory, be any quantitative color space. However some color spaces are better suited as working spaces than others. Color spaces that are more perceptually uniform are better suited to the application but perceptually non-uniform spaces could also be used. For example, HSV (aka HSB) is 3-dimensional color space with the components of hue, saturation, and value (brightness). However, other color spaces, such as CIEL*a*b* may be used as well. Perceptually uniform color spaces are particularly advantageous in cases where color names are associated with prototypical locations in the color space and an algorithmic, geometrical method is used to determine the subvolumes or regions of the color space associated with each prototypical location.

Sometimes, it may be useful to use a multiplicity of color name dictionaries to cover the different types of vocabularies of users. In cases where multiple color dictionaries are used, each dictionary could be mapped independently onto color space regions or lexical mappings between the various dictionaries could be developed.

In addition to a dictionary of color terms, a color control or adjustment system would also use a dictionary of command or instruction language terms to convey color intents or color changes (differences) and the quantitative color differences to which they correspond. In addition to a lexicon of command terms, the command or instruction language would require using, interpreting, or creating a syntax for parsing such commands. Ideally, a created syntax would be relatively simple. A simple example of such a language might be created from three word phrases of the form <magnitude><direction><property> with the following syntax (the symbol ":" denotes "is defined as" and the symbol "|" denotes "or"):

<magnitude>: very-slightly|slightly somewhat|moderately significantly|strongly|very-strongly <direction>: more|less <property>: light|dark|colorful|saturated|contrasty|reddish brownish|yellowish|greenish|bluish|purplish|pinkish|orangeish|grayish Phrases of this language are mapped to the control parameters of color modification transforms applied in a quantitative color space. Any color space could be used for these transforms, but color spaces that are perceptually uniform and with dimensions that relate closely to the perceptual attributes (lightness, chroma and hue) of the human visual system may make for a simpler, more intuitive mapping process.

The embodiments of the color control system disclosed herein would typically be implemented through software including a user interface that would provide users with a means to specify colors, color changes (differences), or color preferences using one or more natural languages.

Figure 1:
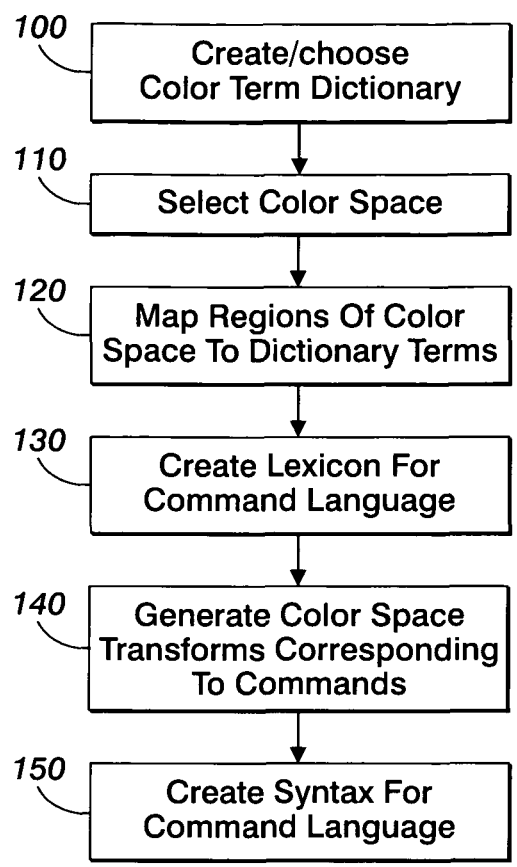
FIG. 1 is a flowchart detailing an exemplary method for correlating a working color space with a natural dictionary of color terms.

Turning to the figures, in embodiments, a usable natural language control system could be created as described in the flowchart of FIG. 1. The steps are listed in a particular order in the flowchart. However, this order should not be considered limiting, as the order of many of these steps may be changed without affecting the resulting color control system. First, a natural language color description dictionary of terms would be created and/or chosen from a set of pre-existing dictionaries 100. Then a color space in which the transformations will be performed is chosen 110. The regions of the color space are then mapped to terms in the color dictionary 120. A dictionary of command terms also needs to be created or selected 130. In embodiments, a library of basic transforms in the color space corresponding to various command terms would also be generated 140. There would be a general mapping between particular transform forms and command forms. The details of a user command would be used to tailor a transform once it was selected from the library as described in more detail with respect to FIG. 3. In addition to generating a lexicon of command terms, a syntax for using the command terms from the command dictionary in combination with the color terms of the color dictionary would be chosen as well 150. Both of the command and color term dictionaries may simply be part of one big dictionary.

Figure 2:
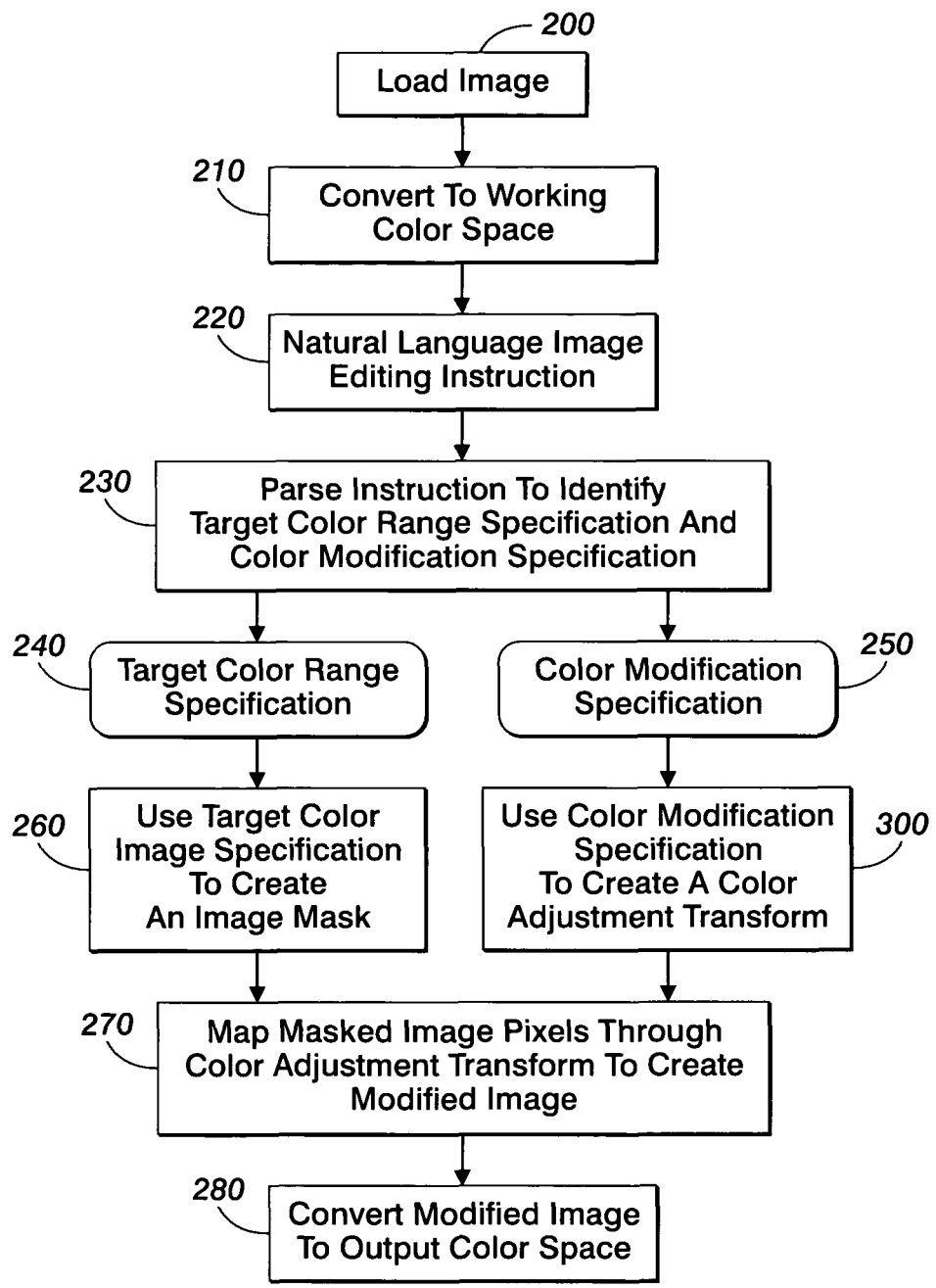
FIG. 2 is a flowchart detailing an exemplary embodiment of a natural language color modification method.

FIG. 2 illustrates a typical embodiment of a natural language color control and calibration system that a user would use to adjust an image or portion thereof. Again, the steps are listed in a particular order in the flowchart. However, this order should not be considered limiting, as the order of many of these steps may be changed without affecting the resulting color control system.

At step 200, the user would select a subject. The subject may be, for example, a scanned or created image or a set of input colors of a multi-dimensional lookup table. The subject may also be a portion of an image. For example, the user may be able to identify a quadrant of an image or a particular object in an image that the user would want to adjust. The natural language system included herein also encompasses the ability to mark areas of an image to be adjusted using a point and click system. At step 210, some or all of the selected subject would be mapped from the initial color space into the working color space of the color control system before or after the command is entered. The initial color space may be, for example, RGB on a display screen or CMYK on a printed document. For an image, for example, this may be a pixel-by-pixel mapping. However, many programs exist to reduce the time and processing power of such a mapping. For example, various algorithms use sampling techniques and/or allow a system to recognize uniform patches. The working color space could be any color encoding in which the color adjustment algorithms referenced in step 230 are conveniently applied. In general, perceptually uniform, device independent color encodings are preferred as working spaces.

The user also issues a verbal or written instruction to indicate the change required in the image at step 220. This command may be entered before or after the image or portion of the image is mapped into the working color space. The language used for this instruction could be the natural language of the user or it might be a language defined or limited by the application; e.g., the application may provide a user interface that could limit the language to a defined vocabulary or facilitate the parsing operation. An application-defined vocabulary may not allow 100% freedom of expression for the user, but could still be large enough to encompass most or all common language terms used with regard to color.

At step 230, the program would translate the entered verbal or written instruction into a color transform in the color working space. The program would contain a set of rules or instructions for parsing the instruction and implementing a transformation to the image corresponding to the user's command. The natural language command may be parsed to separate the command into components such as, for example, a target color range specification 240, and a color modification specification 250.

The target color range specification would include the color or colors to be modified. The target color range specification may also specifically identify colors that are not to be modified. The image adjustment would then be applied only to those colors that are included in the color range specified to be adjusted. In step 260, an image mask would be created from the specified color range 240 and the image in the working color space. The image adjustment will therefore be applied only to those colors that are included in the mask. In embodiments, a particular color might be present in an area of overlapping regions of specified color ranges and therefore might be contained within two or more overlapping ranges. If the user were to enter verbal commands involving both these regions then the program make an internal logic decision based upon a set of preprogrammed rules. For example, the commands may be followed consecutively with the last command entered given priority over earlier commands.

There are many methods, familiar to those of ordinary skill in the art, by which a mask can be created. One such method involves representing the specified color range as a subvolume of the working color space and then determining, for each pixel in the mapped image, if the color of the pixel is inside the specified color range subvolume. All such pixels inside the specified color range subvolume are in the mask while all pixels outside the specified color range subvolume are excluded from the mask. Another method of creating the image mask is to associate with each color in the color name dictionary or dictionaries one or more prototypical locations (points rather than subvolumes) in the working color space. For each image pixel the nearest prototypical color name location is determined and those pixels with nearest prototypical locations associated with color names in the specified color range are included in the mask. Pixels with a nearest prototypical location associated with color names not in the specified color range are excluded from the mask. While it is possible to map each individual pixel, algorithms exist to simplify such mappings. For example, various algorithms use sampling techniques and/or allow a system to recognize uniform patches.

Yet another alternative method to construct the mask is to construct a multidimensional lookup table, the input values of which sample the working color space. When the image pixel colors are mapped through this multi-dimensional lookup table the output values indicate whether the pixel are included in the mask or excluded from the mask. Such an embodiment might result in output values between 0 and 1 where a value of 0 represents exclusion from the mask and a value of 1 represents inclusion in the mask. Since multi-dimensional lookup tables generally use interpolation to determine output values the possibility of values between 0 and 1 exists. In such cases these fractional values could be retained, resulting in a fuzzy or blurred mask. In such a fuzzy or blurred mask pixels returning values between 0 and 1 would be considered to be partially included in the mask. Pixels that are partially in the mask would undergo a partial image adjustment. Alternatively, the output values might be rounded, or otherwise adjusted, to give only values of 0 or 1, thereby generating a binary mask.

Other methods for mapping such input terms into the working color space include, for example, use of Voronoi partitions, other tessellation methods, and k-D trees. A general example of such a method, suitable for both convex and non-convex regions, comprises tessellating each named region in the color space with tetrahedral simplices. Testing whether a given color lies inside any of the tetrahedra comprising the region will determine whether the color lies within the region. In the case of convex regions of the color space simpler tests not requiring tessellation of the region can be used.

In step 300, the natural language instruction is used to create a color adjustment transform. There are numerous methods by which such transforms could be constructed but in general all such methods will include the step of parsing the verbal color modification specification to determine 1) the magnitude of the desired modification, 2) the property that is to be modified and 3) the direction in which it is to be modified. These three pieces of information are a minimum requirement for any color adjustment transform. Additional information might be required to more fully specify the required transform before it can be constructed.

Figure 3:
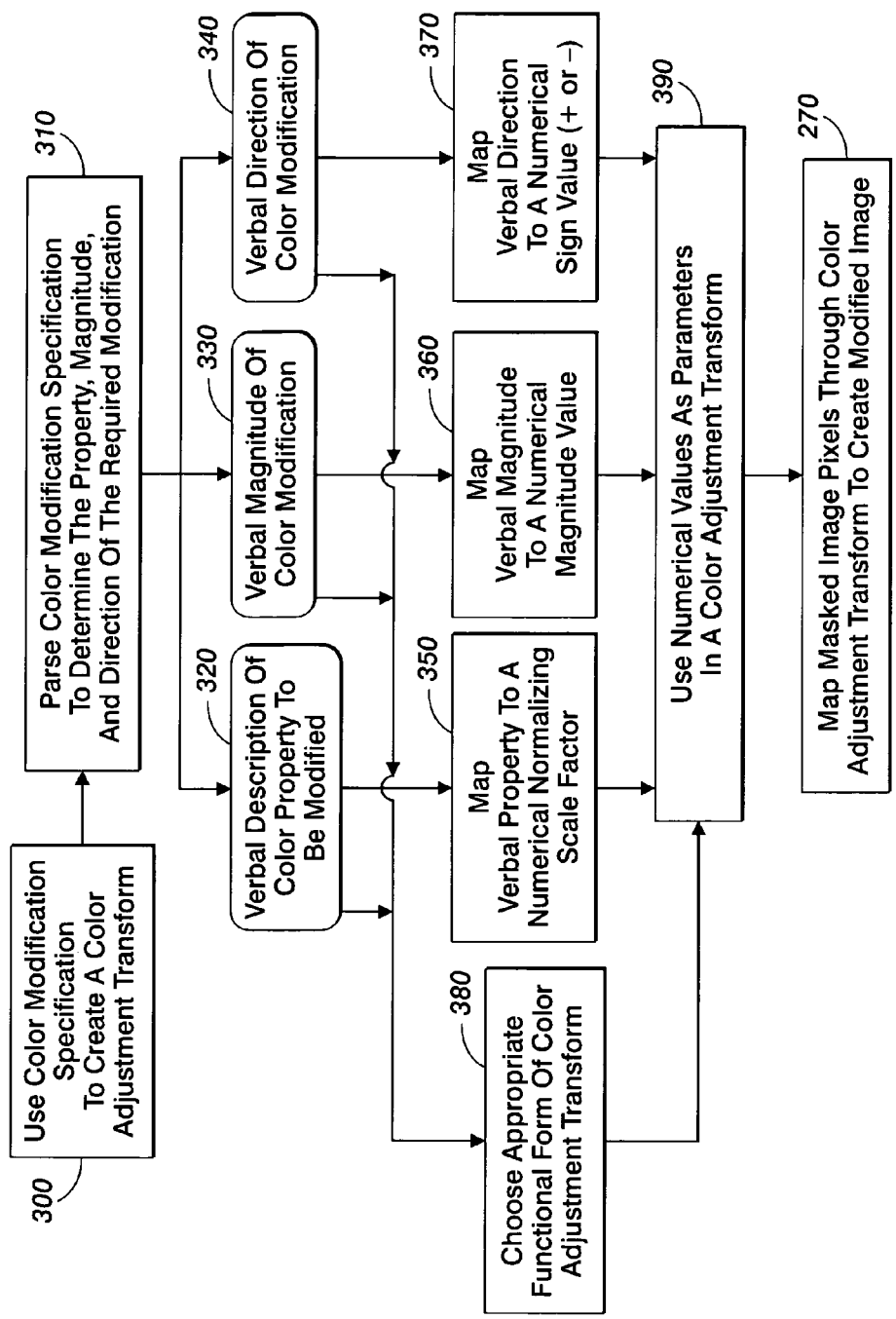
FIG. 3 is a flow chart detailing a general process for implementing a natural language command in a working color space.

Such additional information might be acquired from the pixels that are included in the mask. Such pixel-related information might include color values and spatial locations. The values of individual pixels or population statistics might be used in transform construction. What follows is a general example of transform construction, using an example command or instruction language such as, for example, those discussed herein. The steps involved in this general example of transform construction are illustrated in FIG. 3.

First, a verbal color modification specification is parsed 310 to obtain verbal specifications for the color property to be modified 320, the magnitude of the color modification 330, and the direction of the color modification 340. An example of parsing a natural language image editing instruction is illustrated in Table 2 below.

TABLE 2

| | |
|---|---|
| 220. Natural language image editing instruction | Make the red colors slightly less saturated. |
| 240. Target color range specification | The red colors |
| 250. Color modification specification | slightly less saturated |
| 320. Verbal description of color property to be modified | saturation |
| 330. Verbal magnitude of color modification | slight |
| 340. Verbal direction of color modification | less |

The command, "Make the red colors slightly less saturated" is first parsed per into a target color range specification 240 (the red colors), and a color modification specification 250 (slightly less saturated), as noted earlier. Then at step 300, the color modification specification is parsed into the color property to be modified 320 (saturation), the magnitude of the color modification 330 (slightly), and the direction of the color modification 340 (less).

The verbal description of the color property to be modified is mapped to a numerical normalizing scale factor in step 350. This step allows for the magnitude specifications to be normalized such that the verbal descriptions of magnitude (330) correspond to equivalent or very similar perceptual changes in the target color regardless of the property that is being modified and regardless of the color being modified. For this example, the magnitude of color change requested is "slight" and this should lead to a perceptually similar "slight" change in the target "red" colors regardless of what perceptual property we are changing.

Perceptual properties can include, for example, saturation, lightness, darkness, colorfulness, chroma, hue, contrast, redness, greenness, yellowness, blueness, orange-ness, pinkness, brown-ness, purple-ness, and grayness. Additionally, one could modify any property that could be described as (color-name)-ness by moving the selected colors in a direction toward the prototypical location of (color-name). e.g. to increase the mauve-ness of a selection of colors move them toward the prototypical location of color name 'mauve'.

In step 360, the verbal magnitude of the color modification is mapped onto a numerical magnitude value. Generally, and in the interests of common sense, words that signify a larger magnitude would be mapped onto larger numerical magnitude values, but this is not a requirement. It is desirable however that the numerical magnitude scale, onto which magnitude words are mapped, corresponds linearly to the perceived magnitude that an average population, with normal color vision, associates with the verbal magnitude word or phrase.

Perceptual changes in a property will likely depend in part upon the color being modified and upon its initial scaled value in that property. For example, what constitutes a slight lessening of the saturation of reds in an image would likely be different if there was a low saturation of red in the image, then if there was a high saturation of red. In embodiments, the magnitude of a "slight" property change in the working color space would depend upon the context in which it was used.

Step 370 involves mapping the verbal direction to a numerical sign value (+ or −). This can be simply implemented by mapping the verbal direction to a multiplicative factor of +1 for verbal indications that increase a property and −1 for verbal indications that decrease a property.

The numerical values determined in steps 350, 360 and 370 are used as parameters in a color adjustment transform. This occurs in step 390. Generally a color adjustment transform will have some pre-determined functional form and the numerical values are applied to this functional form to control its specific effect on the colors. The choice of functional form of the color adjustment transform would be made in step 380. The choice might be arbitrarily made by the application designer or the functional form might be algorithmically determined by, for example, the values of the color property to be modified, the verbal magnitude of the color modification and the verbal direction of the color modification. The program implementing converting the natural language command into a transform in the color working space may have a library of basic forms to map to different sets of user instructions. Based upon the natural language command entered by the user, the program selects a functional form from this library. For example, one functional form might be chosen for lightness modifications and a different form chosen for chroma modifications. In this case, the functional form to which the numerical values determined in steps 350, 360 and 370 are applied, would depend on the type of color property to be modified.

As a trivial example of applying the numerical values to a functional form, consider the simple functional form of a linear mapping. Such a mapping will have two parameters—the slope of the line and an intercept. In this trivial example, the linear function would map the original value of the specified color property to a modified output value of that property. The slope of the line could be determined from the product of the values of the numerical normalizing scale factor, the numerical magnitude value and the numerical sign value. The intercept value of such a linear mapping would generally be zero, but might also be derived from the numerical magnitude value in special cases.

More complex functional forms will generally require more parameters to define them. The numerical values determined in steps 350, 360 and 370 would therefore be used to determine the values of the parameters. The numerical values may simply be assigned to the parameters, or parameters may be determined by some mathematical modification of combination of the numerical values.

Returning to FIG. 2, in step 270, a modified color image is created by applying the color modification transform and the image mask created in steps 380 and 260 respectively to the original image. Finally, the modified color image is then converted back to the original color space in step 280.

It is desirable if the transformation applied to the colors is both smooth and maintains color relationships. Smoothness is important to avoid contouring in images and color gradients. The maintenance of color relationships is important to avoid color gradient reversals.

Figure 4:
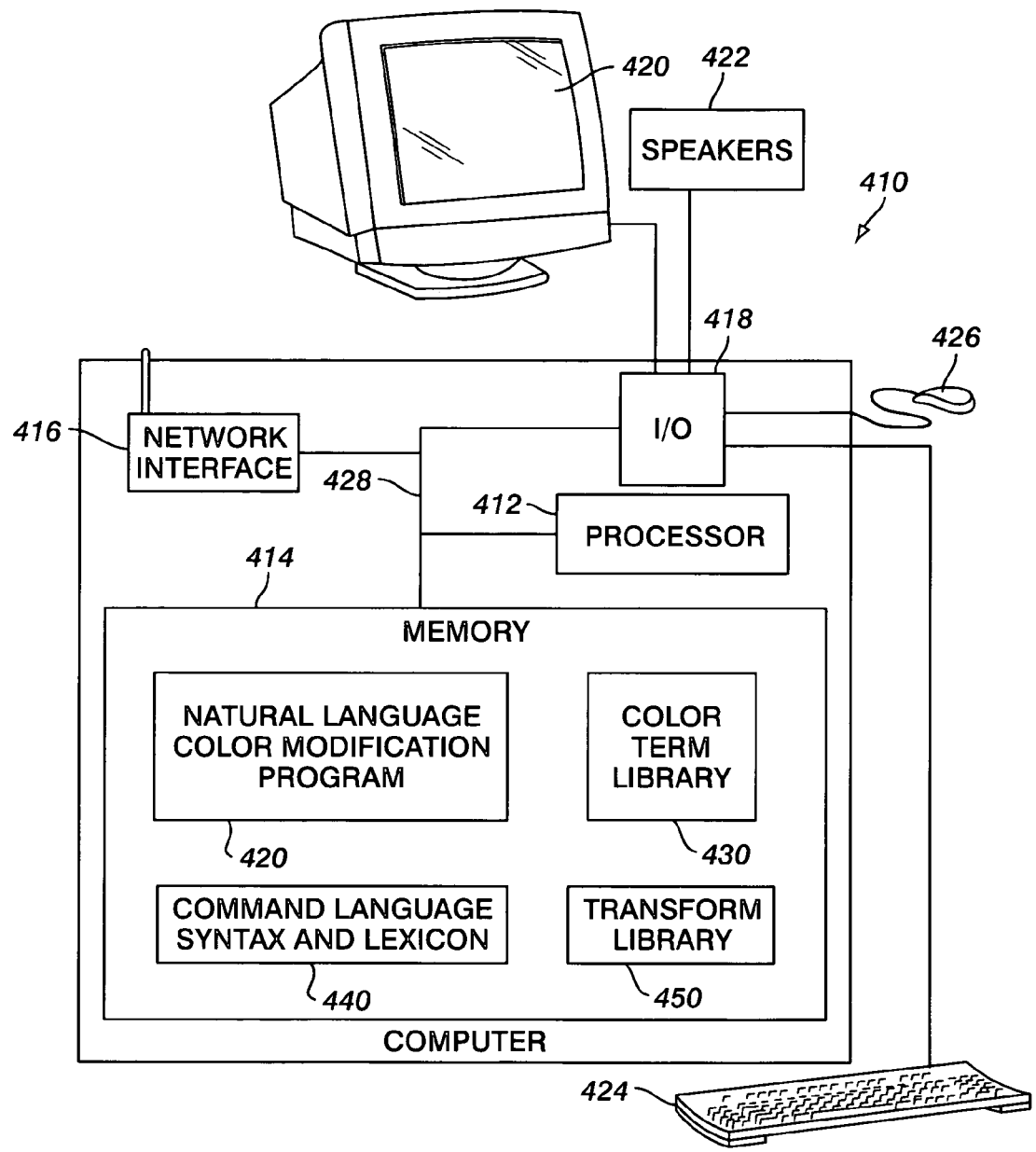
FIG. 4 is a functional block diagram of a computer system comprising the exemplary embodiment of a natural language color modification method according to FIGS. 2 and 3.

FIG. 4 shows a functional block diagram of an exemplary computer system 410 that may implement the methods of FIGS. 2 and 3. The illustrated computer system 410 includes a processor 412, which controls the overall operation of the computer system 410 by execution of processing instructions which may be stored in memory 414 connected to the processor 412. Computer system 410 also includes a network interface 416 and a user input output interface 418. The I/O interface 418 may communicate with one or more of a display 420, for displaying information to users, speakers 422, and a user input device, such as a keyboard 424 or touch or writable screen, for inputting text, and/or a cursor control device 426, such as mouse, trackball, or the like, for communicating user input information and command selections to the processor 412. The various components of the computer 10 may be all connected by a bus 428. The processor 412 executes instructions for performing the method outlined in FIG. 2 and/or FIG. 3. The computer system 410 may be, for example, a mainframe, desktop, laptop, or palmtop computer or a specialized device for modifying color.

Memory 414 holds the instructions for the natural language color modification system 420 described with respect to FIGS. 1-3. Memory 414 may also hold a natural language color term dictionary 430 containing ordinary language color terms that correspond to portions of a working color space, the command term lexicon and syntax 440, and a transform library 450.

The memory 414 may represent any type of computer readable medium, external or internal, such as random access memory (RAM), read only memory (ROM), magnetic disk or tape, optical disk, flash memory, or holographic memory. In embodiments, the memory 14 comprises a combination of these elements. For example, the natural language color term dictionary may be stored on a hard drive while the color modification process instructions may be stored in RAM on a chip. In some embodiments, the processor 12 and memory 14 may be combined in a single chip. The network interface 16 allows the computer to communicate with other devices via a computer network, such as a local area network (LAN) or wide area network (WAN), or the internet, and may comprise a modulator/demodulator (MODEM).

As will be appreciated, FIG. 4 is a high level functional block diagram of only a portion of the components which are incorporated into a computer system 410. Since the configuration and operation of programmable computers are well known, they will not be described further.

FIG. 5 schematically shows an exemplary apparatus for accomplishing the methods disclosed in FIGS. 2 and 3. It is important to note that many or all of these components may be part of the same device. All actions taken by the components described herein may be performed using a common processor or array of processors. A document or image input device 500 would be the source of data corresponding to a color image. The input device 500 could be, for example, a color scanner, a personal computer or workstation with appropriate document or image creation software, a camera or a data storage device, or internet linked electronic storage. The image data to be modified is selected by a user through a user interface. The image data is then sent to a color mapping device 510 where it is converted to a working color space—preferably, one that has separate luminance, chrominance, and hue components, although other color spaces can be used. The color mapping device 510 can take various forms and operational details, such as, for example, software running on a processor, or an ASIC. It may also be a component of the image input device 500. The apparatus also contains a parser 520 for parsing commands entered by a user. In embodiments, the parser 520 reduces a user command into a color (or colors) being modified and a modification to be made to that color. In embodiments. the system uses the color dictionary 430 to determine which colors are being affected by the user entered command. A mask generator 530 identifies the areas of the working color space corresponding to the user-entered color or colors to be modified. A parser 540 also separates a modification command into a characteristic to be modified, a magnitude, and a direction of modification. In embodiments, the command language and syntax is compared to pre-defined terms and structures in the command language lexicon and syntax 440. Parser 540 may be the same as parser 520 or it may be performed as a separate process. In embodiments, a transform generator 550 then selects the form of the transform from the transform library 450 in the working color space. The transform generator 550 creates the transform to be applied by modifying the transform by the user's command language. A transform applicator 560 applies the transform to the volumes in the color space corresponding to the colors to be modified. Finally, a modified image output unit 570 sends the image to an appropriate output device, e.g., a display screen, a printer, a facsimile machine, or electric paper.

The present invention as disclosed in embodiments herein may possibly be extended beyond color control systems and methods of controlling color. Modification and control of other image processing operations may also benefit from a natural language command interface. Such image processing operations might include sharpening, noise reduction, posterization and other special effects.

The color control system described herein is one application of a natural language command system. It is foreseen that the natural language color modification method disclosed herein may work for other properties as well as color and that the invention also encompasses modifications to documents based upon natural language commands beyond color control systems.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method for adjusting the color of a document using a natural language color control system, the method comprising:
receiving a document in an initial color space from an image input device;
mapping the document into a working color space;
receiving a natural language command from a user to adjust one or more colors of at least a portion of the document, wherein the natural language command the user specified one or more colors and an associated adjustment in natural language;
parsing the natural language command into (1) a description of a color property to be modified, (2) a magnitude of color modification, and (3) a direction of modification;

converting the parsed natural language command into a transform in the working color space;

applying the transform to the one or more selected colors of the at least a portion of the document in the working color space;

adjusting the one or more selected colors of the document based upon the application of the transform in the working color space; and sending the document having the adjusted one or more selected colors to an appropriate output device.

2. The method of claim 1, wherein the color range to be modified is determined with reference to a natural language color dictionary.

3. The method of claim 1, further comprising generating a mask that includes only those colors to be modified.

4. The method of claim 1, wherein the modification to be made to the color is determined with reference to a command language lexicon and syntax.

5. The method of claim 1, wherein converting the natural language command into a transform in the working color space includes selecting a basic form of the transform from a transform library and tailoring it based upon the natural command.

6. The method of claim 1, wherein adjusting one or more of the selected colors includes adjusting one or more of the following properties: lightness, darkness, colorfulness, chroma, saturation, contrast, hue, redness, greenness, yellowness, blueness, orange-ness, pink-ness, brown-ness, purple-ness, and grayness.

7. The method of claim 1, wherein the step of converting the natural language command into a transform in the working color space includes constructing a multidimensional lookup table.

8. A natural language color control system, comprising:

an image input device for inputting an image;

a color mapping device that maps the colors of the image into a working color space;

a parser that parses a natural language command entered by a user, where the command includes instructions to alter one or more colors in the image;

a transform generator that generates a transform corresponding to the command entered by the user;

a transform applicator that applies the transform generated by the transform generator to the one or more colors in the image; and a modified image output unit that receives the image after the generated transform is applied to the one or more colors in the image.

9. The system of claim 8, further comprising a color mask generator.

* * * * *